United States Patent Office 3,294,860
Patented Dec. 27, 1966

3,294,860
CATALYST AND PROCESS FOR OLEFIN POLYMERIZATION
John T. Loft, Stuart S. Nesbitt, and William B. York, Tulsa, Okla., assignors to Sunray DX Oil Company, a corporation of Delaware
No Drawing. Filed Mar. 22, 1962, Ser. No. 181,771
14 Claims. (Cl. 260—683.15)

This invention relates to a novel catalyst and process for the polymerization of normally gaseous olefins to produce liquid polymers thereof most selectively.

It is an object of this invention to provide a process for polymerizing normally gaseous olefins such as ethylene to produce selectively polymers rich in dimers and other liquid polymers.

Another object of this invention is to provide novel and highly useful catalysts for the polymerization of gaseous olefins to liquid polymers containing substantial amounts of dimers.

A further object of the invention is to provide methods for the preparation of the novel catalyst systems.

The olefins which are polymerized according to the process of the present invention are the lower molecular weight olefins which are normally gaseous at ambient temperatures and pressures. These include ethylene, propylene, butene-1, butene-2, isobutylene and the like. The reactant olefins can be employed in pure state or, if desired, can be diluted with non-reactive hydrocarbons such as saturated hydrocarbons which may be either liquid or gaseous under the conditions of the polymerization reaction. Feeds composed of mixed olefins can also be employed.

In the practice of this invention the reactant olefins are polymerized in the presence of a polymerization catalyst consisting essentially of the reaction product of a boron compound and an aluminum compound, the boron compound being selected from the group consisting of boron alkyls, boron hydrides, boric acid, mono- and dialkyl boric acids, aryl boric acids, boric acid esters, boric oxide, sodium borate and combinations thereof and the aluminum compound being selected from the group consisting of aluminum alkoxides, aluminum phosphate, aluminum hydroxide, aluminum acetaylacetonate, aluminum silicofluoride, aluminum citrate and combinations thereof. Examples of specific boron and aluminum compounds which can be used to form the catalyst of the invention are triethylborane, tri-n-propylborane, tri-n-amylborane, tri-n-butylborane, diborane ($B_2H_6$), pentaborane ($B_5H_9$), decaborane ($B_{10}H_{14}$), nonyl boric acid, didecyl boric acid, phenyl boric acid, methyl borate, tri-n-butylborate, 2-methyl-2,4-pentanediol hydrogen borate, tri-2-ethylhexylborate, bis(2-methyl-2,4-pentanediol) diborate, aluminum ethoxide, aluminum isopropoxide, aluminum tertiary butoxide and the like.

These novel catalysts are prepared by reacting the named boron and aluminum compounds at temperatures ranging from about 250 to 800° F., more preferably 500 to 700° F. for a time sufficient to form the desired reaction product. The heating period will range in general from about 0.01 to 10 hours. When employing liquid reactants, a pressure sufficiently high to maintain volatile reactants in substantially the liquid state is employed and pressures from 0 to about 2000 p.s.i.g. or higher are satisfactory. An unreactive liquid reaction medium or solvent such as methyl cyclohexane, decalin, pentane or other inert solvent is preferably employed, particularly when utilizing solid reactants in carrying out the reaction of the boron and aluminum compounds. The molar ratio of the boron compound to the aluminum compound ranges from about 0.01:1 to 100:1, the preferred range being from 0.1:1 to 3:1. During preparation of the solid catalyst, it is preferable to exclude water and air to avoid detrimental effect on the polymerization activity of the catalyst.

These new polymerization catalysts are solids and can be used in pellet or powdered form. The catalysts can be deposited on suitable inert granular carriers as for example alumina (preferably alumina which has been deactivated by heating at temperatures above 1900° F.), charcoal, diatomaceous earths, quartz, kaolin, silica, fuller's earth and other catalyst supports known in the art. This can be done simply by including the carrier or support material in the reaction between the boron and aluminum compounds to form the catalyst. These carrier materials can be present in proportions up to as high as 99 percent more or less of the final catalytic material.

The olefin polymerization process of the invention is characterized by the extreme flexibility of the operating conditions which can be employed and also the selectivity in producing liquid polymers containing substantial amounts of dimeric products. The polymerization process can be conducted as a batch type reaction or as a continuous process in the presence of the dry catalyst or in the presence of a liquid reaction medium or solvent which is unreactive under the polymerization conditions to either the catalyst or olefin feed materials. Suitable liquid reaction media or diluents include, for example, decalin, methylcyclohexane, pentane, isopentane and other saturated hydrocarbon solvents.

The flexibility of operating conditions for a continuous olefin polymerization reaction using the novel catalysts of the invention is shown from the tabulation in Table I:

TABLE I

| Olefin | Operable Temp. °F. | Preferred Temp. °F. | Operable Pressure p.s.i.g. | Preferred Pressure p.s.i.g. | Operable Space Vel.[1] | Preferred Space Vel.[1] |
|---|---|---|---|---|---|---|
| Ethylene | 400–1,000 | 700–800 | 15–3,000 | 100–1,600 | 0.1–20 | 0.2–5 |
| Propylene | 250–1,000 | 500–800 | 15–3,000 | 20–1,600 | 0.1–20 | 0.2–10 |
| Butene-1 | 150–1,000 | 500–600 | 15–3,000 | 20–1,600 | 0.5–30 | 1.0–15 |
| Butene-2 | 150–1,000 | 500–750 | 15–3,000 | 20–1,600 | 0.5–30 | 1.0–15 |
| Isobutylene | 150–1,000 | 400–600 | 15–3,000 | 20–1,600 | 0.5–30 | 1.0–15 |

[1] Grams of olefin per hour per gram of catalyst (carrier plus catalyst weight).

Non-reactive diluents such as propane or other saturated hydrocarbons can be employed with the olefin feed if desired. For batch type polymerization reactions temperatures and pressures the same as given above can be employed and the weight ratio of catalyst to monomer feed can generally be varied in the range from about 0.01 to about 50% or more by weight.

The invention is further illustrated by the following specific examples which are not to be considered limitative thereof.

Example I

Aluminum isopropoxide (102 g., 0.5 mole) was dissolved in dry benzene (300 ml.) and poured over 4–10 mesh alumina (400 g. previously sintered at 1900° F.). The benzene solvent was removed under vacuum at 77° F. and tri-n-butylborane (80.5 g., 0.44 mole) dissolved in methyl cyclohexane (120 ml.) was added. This mixture was heated in glass in a 2.2 liter pressure vessel for one hour at 500 to 600° F. under an initial dry nitrogen pressure of 500 p.s.i.g. After cooling and releasing the pressure, the catalyst was removed, dried at 140° F. and 1 mm. pressure, and the dust removed with a stream of dry nitrogen. This yielded 468 g. of finished catalyst which contained 68 g. (15%) of active material.

This catalyst (200 g.) was charged to a continuous flow reactor. A number of runs were made in which temperatures were varied from 475 to 675° F., pressures from 800 to 2000 p.s.i.g. and space velocities from 0.3 to 1.1 grams of propylene per hour per gram of catalyst. The percent conversion of propylene was directly related to the reaction conditions. For example, conditions of temperature 675° F., pressure 1800 p.s.i.g. and space velocity 0.5 g./hr./g. gave 95 percent conversion of propylene to liquid polymers, while conditions of temperature 474° F., pressure 800 p.s.i.g. and space velocity 0.4 g./hr./g. gave only 8.8 percent conversion of propylene to liquid polymers.

The distillation of the product (42.4 percent conversion) produced at 673° F., 1800 p.s.i.g. pressure and space velocity of 1.0 g./hr./g. is shown in Table II.

TABLE II

| Fraction No. | Boiling Range, ° F. | Weight in Grams | Percent |
|---|---|---|---|
| 1 | 110–166 (C₆ olefins) | 47.3 | 28.5 |
| 2 | 166–255 | 16.2 | 9.8 |
| 3 | 255–298 (C₉ olefins) | 47.3 | 28.5 |
| Bottoms | Greater than 298 | 55.1 | 33.2 |
| Total | | 165.9 | 100.0 |

The presence of propylene dimers was established by identification of the following compounds (Table III) in the 110–166° F. boiling fraction:

TABLE III

| | Percent |
|---|---|
| Propane and propylene | 1.10 |
| Butanes and butylenes | 0.59 |
| 3,3-dimethyl-1-butene | 3.00 |
| 4-methyl-1-pentene and 3-methyl-1-pentene | 11.50 |
| 4-methyl-2-pentene and 2,3-dimethyl-1-butene | 10.00 |
| 2-methyl-1-pentene | 8.90 |
| 2-methyl-2-pentene | 22.80 |
| Trans-3-methyl-2-pentene | 9.60 |
| Cis 3-methyl-2-pentene | 20.86 |
| 2,3-dimethyl-2-butene | 5.90 |
| Saturates and $C_5$ hydrocarbons | 3.45 |
| $C_7$ and heavier olefins | 2.30 |
| | 100.00 |

*Example II*

Aluminum isopropoxide (23.3 g., 0.114 mole) and tri-n-butylborane (15.7 g., 0.086 mole) were dissolved in dry methyl cyclohexane (100 ml.) and poured over 4–10 mesh carrier (83.4 g. of pelletized diatomaceous silica which had been evacuated, dried and stored under dry nitrogen) in a glass container. This was placed in a 2.2 liter pressure vessel, pressured to 500 p.s.i.g. with dry nitrogen and heated at 500 to 550° F. for two hours. The reactor was cooled and the pressure released. The catalyst was removed and evacuated at 140° F. and 0.4 mm. of mercury pressure for one hour to remove adhering solvent. The finished catalyst (89.2 g.) contained 5.8 g. of active material (6.5%).

This catalyst was placed in a continuous reactor system and heated at 650° F. for 52 minutes while propylene was passed through at space velocity of about 2 grams per hour per gram of catalyst. The pressure was 700 to 800 p.s.i.g.

The distillation of the product (65 g.) is shown below:

TABLE IV

| Fraction No. | Boiling Range, ° F. | Weight in Grams | Percent |
|---|---|---|---|
| 1 | 110–166 | 20.1 | 31.0 |
| 2 | 166–255 | 3.9 | 6.0 |
| 3 | 255–298 | 19.6 | 30.1 |
| Bottoms | Greater than 299 | 19.8 | 30.4 |
| Loss | | 1.6 | 2.5 |
| Total | | 65.0 | 100.0 |

*Example III*

Aluminum isopropoxide (40.8 g., 0.2 mole) and tri-n-butylborane (3.6 g., 0.02 mole) were dissolved in methyl cyclohexane and the reaction product deposited on the same 4–10 mesh carrier (81.7 g.) as in Example II. The finished catalyst contained 10.1 percent of active material.

This catalyst (90 g.) was charged to a continuous flow reactor. Propylene was pumped through the catalyst bed (space velocity of 2.5 grams per hour per gram of catalyst) while heating at 675 to 750° F. under 800–850 p.s.i.g. pressure. This gave a conversion to liquid polymer of 14.3 percent. The propylene dimer content of this was 21.2 percent.

*Example IV*

Aluminum isopropoxide (4.1 g., 0.02 mole) and tri-n-butylborane (36.4 g., 0.2 mole) were reacted and deposited on the catalyst carrier (82 g., 4–10 mesh) as in Example II. The finished catalyst (after solvent removal) contained 11.2 percent of active material.

A continuous flow reactor was charged with this catalyst (90 g.) and heated at 580 to 700° F. Propylene was pumped through at a space velocity of 4.2 g./hr./g. under 800 p.s.i.g. pressure. The conversion to liquid polymer was 22.8 percent. At 700 to 775° F., 800–840 p.s.i.g. pressure and space velocity of 3.0 g./hr./g. the conversion to liquid polymer was 12.1 percent. Forty-two percent of this was propylene dimer and 23.9 percent was propylene trimer.

*Example V*

Aluminum isopropoxide (10.4 g., 0.05 mole) and tri-n-butylborane (27.8 g., 0.15 mole) were reacted and deposited on a granular charcoal carrier (113 g. of 6–14 mesh charcoal) as in Example II. In this case, the finished catalyst contained 18.4 percent of the active material.

This catalyst (100 g.) was charged to the continuous reactor. Propylene was pumped through at a space velocity of 2.9 grams per hour per gram of catalyst (800 p.s.i.g. pressure) while the catalyst bed was heated at 640–650° F. The conversion to liquid polymer was 27.2 percent. The propylene dimer content of this material was 20.5 percent and the trimer content was 26 percent.

At 660–695° F., 800 p.s.i.g. pressure and a propylene space velocity of 2.6 grams per hour per gram of catalyst, the conversion to liquid polymer was 33.9 percent. The dimer content of this product was 31.6 percent and the trimer content 29.6 percent.

*Example VI*

The reaction product of aluminum isopropoxide (71.4 g., 0.35 mole), boric anhydride (17.4 g., 0.25 mole) and tri-n-butylborane (18.2 g., 0.1 mole) was deposited on 4–10 mesh carrier (184 g.) as in Example II. The solvent used was Decalin (170 ml.) and the heating period was 2.25 hours.

A continuous flow reactor was charged with this catalyst (65.9 g., 150 cc.). Propylene was pumped through under three sets of conditions:

(a) Temperature: 500–600° F. Pressure: 800 p.s.i.g. Space velocity: 5.6 g./hr./g. The conversion to liquid polymer was 19.2 percent. Forty percent of this was propylene dimer and 27.6 percent was propylene trimer.

(b) Temperature: 600–700° F. Pressure: 800 p.s.i.g. Space velocity: 5.2 g./hr./g. The conversion to liquid polymer was 31.3 percent. The propylene dimer content of the product was 42.5 percent and the trimer content was 28.6 percent.

(c) Temperature: 600–700° F. Pressure: 800 p.s.i.g. Space velocity: 4.8 g./hr./g. The conversion to liquid polymer was 33.8 percent, of which 45.8 percent was propylene dimer and 26.2 percent was propylene trimer.

*Example VII*

A fresh charge (67.9 g.) of the catalyst of Example VI was placed in the continuous flow reactor. A mixture of propylene and propane (57.6 weight percent propylene) was pumped through the catalyst bed under three sets of conditions (pressure held constant at 800 p.s.i.g.):

(a) Temperature: 500–600° F. Space velocity: 3.7 g./hr./g. The conversion (based on propylene in the mixture) to liquid product was 10.6 percent.

(b) Temperature: 600–700° F. Space velocity: 3.6 g./hr./g. The conversion to liquid polymer, based on propylene content of the charge was 30.9 percent. The propylene dimer content of this was 42.3 percent and the trimer content was 22.8 percent.

(c) Temperature: 625–700° F. Space velocity: 7.4 g./hr./g. The conversion (based on propylene in the mixture) to liquid polymer was 15.1 percent, of which 53.6 percent was propylene dimer and 24.7 percent was trimer.

*Example VIII*

The catalyst of Example VI was heated at 510–540° F. while butene-1 was pumped through at a space velocity of 5.4 g./hr./g. (810–850 p.s.i.g. pressure). The conversion to liquid polymer was 12.6 percent. The butylene dimer content of this product was 72.1 percent.

Butene-2 was pumped through the same catalyst at a space velocity of 4.19 g./hr./g. (810–850 p.s.i.g. pressure and 530–550° F.) The conversion to liquid polymer was 19.2 percent, of which 66.4 percent was butene dimer. An increase in space velocity to 6.04 g./hr./g. and temperature to 710–750° F. resulted in 36.8 percent conversion to liquid polymer. The butylene dimer content of the product was 68.3 percent.

*Example IX*

A fresh charge (65 g.) of the catalyst of Example VI was placed in the continuous flow reactor. Propylene was pumped through the catalyst bed under four sets of conditions:

(a) Temperature: 725–800° F. Pressure: 0 p.s.i.g. Space velocity: 4.01 g./hr./g. No liquid polymer was obtained.

(b) Temperature: 700–750° F. Pressure: 20 p.s.i.g. Space velocity: 3.82 g./hr./g. The conversion to liquid polymer was 0.6 percent.

(c) Temperature: 700–750° F. Pressure: 50 p.s.i.g. Space velocity: 4.51 g./hr./g. The conversion to liquid polymer was 3.2 percent.

(d) Temperature: 770–820° F. Pressure: 120 p.s.i.g. Space velocity: 5 g./hr./g. The conversion to liquid polymer was 15.1 percent. The propylene dimer content of this was 65 percent.

*Example X*

Aluminum isopropoxide (20.4 g., 0.1 mole), tri-n-butylborate (23.0 g., 0.1 mole), dry methyl cyclohexane, (23 g.) and isobutylene (300 g., 5.4 moles) were mixed in a 2.2 liter pressure vessel. This was heated at 500–550° F. for one hour, during which the pressure decreased 260 p.s.i.g. Conversion to liquid polymer was 87.3 percent. The butylene dimer content of the product was 55.3 percent.

*Example XI*

Aluminum phosphate (12.2 g., 0.1 mole) which had been dried at 575–600° F. for three hours, and tri-n-butylborane (18.2 g., 0.1 mole) were mixed with dry n-pentane in a 2.2 liter pressure vessel. Propylene (254 g., 6 moles) was pumped in and the reactor heated at 675–700° F. for two hours. This gave 29.7 percent conversion of propylene to liquid polymer, of which 25 percent was identified as propylene dimer.

*Example XII*

Aluminum citrate (21.6 g., 0.1 mole) which had been dried at 226–241° F. for six hours was mixed with tri-n-butyl-borane (18.2 g., 0.1 mole) and 75 ml. of dry Decalin. This was charged to a 2.2 liter pressure vessel and propylene (326 g., 7.8 moles) added. Heating for two hours at 635–663° F. gave 80 g. (24.5 percent) of liquid polymer, containing 27.1 percent propylene dimer and 19.5 percent trimer.

*Example XIII*

Propylene (31.0 g., 7.4 moles) was heated at 650–680° F. for 2.25 hours in a 2.2 liter pressure vessel with sodium borate (38.1 g., 0.1 mole) and aluminum isopropoxide (20.4 g., 0.1 mole). This gave 69 g. (22.3 percent) of liquid polymer which contained 22.7 percent propylene dimer.

*Example XIV*

Aluminum isopropoxide (20.4 g., 0.1 mole), boric anhydride (4.2 g., 0.06 mole) and tri-n-butylborane (5.5 g., 0.03 mole) were mixed in 106 ml. of dry Decalin and charged to a 2.2 liter pressure vessel. Ethylene (112 g., 4 moles) was admitted and the reactor heated at 620–650° F. for one hour. Analysis of the resulting gas mixture showed the presence of butylenes. Since, as demonstrated in Example VIII, butylenes readily polymerize at 510–550° F., little butylene would be expected to remain in this reaction at 620–650° F. Most of the butylene, as it was formed, was converted to the liquid polymer (5 g., 4.5 percent) which was isolated. This product was composed of butylene dimers and higher liquid polymers of butylene.

*Example XV*

Tri-n-butylborane (18.2 g., 0.1 mole), aluminum acetylacetonate (22.7 g., 0.07 mole), propylene (406 g., 9.7 moles) and 75 ml. of Decalin as a solvent were heated together at 610–635° F. for 1 hour in a 2.2 liter pressure vessel. This gave 120 g. (29.6 percent) of liquid polymer containing 15.7 percent propylene dimer.

*Example XVI*

Aluminum isopropoxide (20.4 g., 0.1 mole) and boric anhydride (7.0 g., 0.1 mole) were mixed with Decalin (70 ml.) and heated to 350° F. at atmospheric pressure. After cooling, this mixture was charged along with propylene (250 g., 5.9 moles) to a 2.2 liter pressure vessel. The mixture was heated at 650–675° F. for one hour at 1285–1750 p.s.i.g. pressure. This gave 115 g. (46 percent) of liquid polymer containing 32.5 percent propylene dimer.

*Example XVII*

Boric acid (6.18 g., 0.1 mole), aluminum isopropoxide (20.4 g., 0.1 mole), dry Decalin solvent (100 ml.) and propylene (290 g., 7 moles) were charged to a 2.2 liter pressure vessel. This mixture was heated for 2.3 hours at 600–670° F. to give 187 g. (64.5 percent) liquid polymer, containing 29.6 percent propylene dimer and 22.3 percent propylene trimer.

*Example XVIII*

Aluminum silicofluoride (24.0 g., 0.05 mole) and tri-n-butylborane (18.2 g., 0.1 mole) were mixed in dry n-pentane (75 ml.) and charged to a 2.2 liter pressure vessel. Propylene (295 g., 7 moles) was added and the mixture heated at 650–700° F. for four hours. This gave 178 g. (60.4 percent) of liquid polymer. The propylene dimer content of this product was 27 percent and the trimer content was 14.6 percent.

Example XIX

Aluminum isopropoxide (20.4 g., 0.1 mole) and tri-n-butylborate (23 g., 0.1 mole) were mixed in Decalin (100 ml.) and charged to a 2.2 liter pressure vessel. Propylene (315 g., 7.5 moles) was added and the mixture was heated at 520–590° F. for fifty minutes under an initial pressure of 1925 p.s.i.g. at 520° F. This reaction gave 164 g. (52.1 percent) liquid polymer, which contained 29.6 percent propylene dimer and 20.8 percent propylene trimer.

Example XX

A solution of tri-n-butylborate (45.9 g., 0.2 mole) and aluminum isopropoxide (40.8 g., 0.2 mole) in Decalin (130 ml.) was poured over 122 g. of 4–10 mesh carrier. The mixture was heated in a pressure vessel at 550–575° F. at 1525–1610 p.s.i.g. nitrogen pressure for 2.5 hours. The pressure was released, the major portion of the solvent removed by distillation, and the reactor cooled. The resulting catalyst was heated (140° F.) for two hours under reduced pressure (1–2 mm. of mercury) to remove the last traces of solvent. The finished catalyst (134.4 g.) contained 9.2 percent of active material. This catalyst (63.4 g.) was charged to a continuous flow reactor and propylene was pumped through under three sets of conditions:

(a) Temperature: 56°–610° F. Pressure: 600–625 p.s.i.g. Space velocity: 4.8 g./hr./g. The conversion to liquid polymer was 5.5 percent. Sixty five percent of this was propylene dimer and fifteen percent was propylene trimer.

(b) Temperature: 600–640° F. Pressure: 800–810 p.s.i.g. Space velocity: 4.4 g./hr./g. The conversion to liquid polymer was 16.4 percent. Fifty eight percent of this was propylene dimer and twenty five percent was propylene trimer.

(c) Temperature: 700–720° F. Pressure: 600 p.s.i.g. Space velocity: 4.9 g./hr./g. The conversion to liquid polymer was 27.3 percent. Fifty five percent of this was propylene dimer and twenty five percent was propylene trimer.

Example XXI

Aluminum ethoxide (16.2 g., 0.1 mole), trimethyl borate (10.4 g., 0.1 mole) and Decalin (103 g.) were mixed and charged to a 2.2 liter pressure vessel. Propylene (335 g., 8 moles) was added and the mixture was heated at 610–680° F. for 45 minutes under initial pressure of 2250 p.s.i.g. at 610° F. This reaction gave 157 g. (46.9 percent) liquid polymer. The propylene dimer content of this product was 28 percent and the trimer content was 31 percent.

The advantages of the present invention are readily apparent from the foregoing description and experimental data. The invention provides a particularly advantageous process for polymerizing normally gaseous olefins to produce polymers rich in dimers. Moreover, the invention provides a new catalyst particularly useful for the conversion of gaseous olefins to low molecular weight olefinic polymers. The new catalyst is easily prepared and can be conveniently deposited on suitable inert carriers. The new catalyst is not air sensitive or pyrophoric in nature and can be used for extended periods of time with efficient results either in the presence or absence of liquid reaction media or solvents.

Those modifications and equivalents which fall within the spirit of the invention and the scope of the appended claims are to be considered part of the invention.

We claim:

1. A process for the preparation of a catalyst useful for the polymerization of olefins which comprises heating at a temperature of about 500 to 700° F. for a period of about 0.01 to 10 hours a reactant combination selected from the group consisting of:
   (a) An aluminum alkoxide with a boron alkyl;
   (b) An aluminum alkoxide with an alkyl borate;
   (c) Aluminum phosphate with a boron alkyl;
   (d) Aluminum citrate with a boron alkyl;
   (e) An aluminum alkoxide with sodium borate;
   (f) Aluminum acetylacetonate with a boron alkyl;
   (g) An aluminum alkoxide with boric anhydride;
   (h) An aluminum alkoxide with boric acid; and
   (i) Aluminium silicofluoride with a boron alkyl; with the molar ratio of the said boron reactants to the said aluminum reactants being in the range from about 0.01:1 to 100:1.

2. A catalyst useful for the polymerization of olefins which consists essentially of a reaction product obtained by reacting at a temperature of about 500 to 700° F. for a period of about 0.01 to 10 hours a reactant combination selected from the group consisting of:
   (a) An aluminum alkoxide with a boron alkyl;
   (b) An aluminum alkoxide with an alkyl borate;
   (c) Aluminum phosphate with a boron alkyl;
   (d) Aluminum citrate with a boron alkyl;
   (e) An aluminum alkoxide with sodium borate;
   (f) Aluminum acetylacetonate with a boron alkyl;
   (g) An aluminum alkoxide with boric anhydride;
   (h) An aluminum alkoxide with boric acid; and
   (i) Aluminium silicofluoride with a boron alkyl; with the molar ratio of the said boron reactants to the said aluminum reactants being in the range from about 0.01:1 to 100:1.

3. A catalyst in accordance with claim 2 wherein the reaction product is supported on an inert carrier.

4. A catalyst in accordance with claim 2 which consists essentially of the reaction product of aluminum isopropoxide and tributylborate.

5. A catalyst in accordance with claim 2 which consists essentially of the reaction product of aluminum isopropoxide, boric anhydride and tri-n-butylborane.

6. A catalyst in accordance with claim 2 which consists essentially of the reaction product of aluminum ethoxide and trimethyl borate.

7. A process for the polymerization of normally gaseous olefins to produce polymers thereof which comprises contacting the normally gaseous olefins at a temperature in the range from about 150 to about 1000° F. and at a pressure of from 15 to 3000 p.s.i.g. with a catalyst as defined in claim 5.

8. A process for the polymerization of normally gaseous olefins to produce polymers thereof which comprises contacting the normally gaseous olefins at a temperature in the range from about 150 to about 1000° F. and at a pressure of from 15 to 3000 p.s.i.g. with a catalyst as defined in claim 2.

9. The process of claim 8 wherein the olefin feed is continuously passed into contact with said catalyst at a rate in the range of about 0.1 to 30 grams of olefin feed per gram of catalyst per hour.

10. The process of claim 8 wherein the olefin feed comprises ethylene and said contact is carried out at a temperature in the range from about 400 to 1000° F.

11. The process of claim 8 wherein the olefin feed comprises propylene and said contact is carried out at a temperature in the range from about 500 to 800° F. and a pressure from about 20 to 1600 p.s.i.g.

12. The process of claim 8 wherein the olefin feed comprises butene-1 and said contact is carried out at a temperature in the range from about 500 to 600° F. and a pressure from about 20 to 1600 p.s.i.g.

13. The process of claim 8 wherein the olefin feed comprises butene-2 and said contact is carried out at a temperature in the range from about 500 to 750° F. and a pressure from about 20 to 1600 p.s.i.g.

14. The process of claim 8 wherein the olefin feed comprises isobutylene and said contact is carried out at a temperature in the range from about 400 to 600° F. and at a pressure from about 20 to 1600 p.s.i.g.

References Cited by the Examiner

UNITED STATES PATENTS

| | | | |
|---|---|---|---|
| 1,931,492 | 10/1933 | Bennicke | 252—432 |
| 2,245,734 | 6/1941 | Subkow | 260—683.15 |
| 2,296,395 | 9/1942 | Michael et al. | 252—432 |
| 2,867,675 | 1/1959 | Shapiro et al. | 260—683.15 |
| 2,976,333 | 3/1961 | Dixon et al. | 252—432 |
| 3,009,972 | 11/1961 | Johnson | 260—683.15 |

PAUL M. COUGHLAN, JR., *Primary Examiner.*

ALPHONSO D. SULLIVAN, *Examiner.*